UNITED STATES PATENT OFFICE.

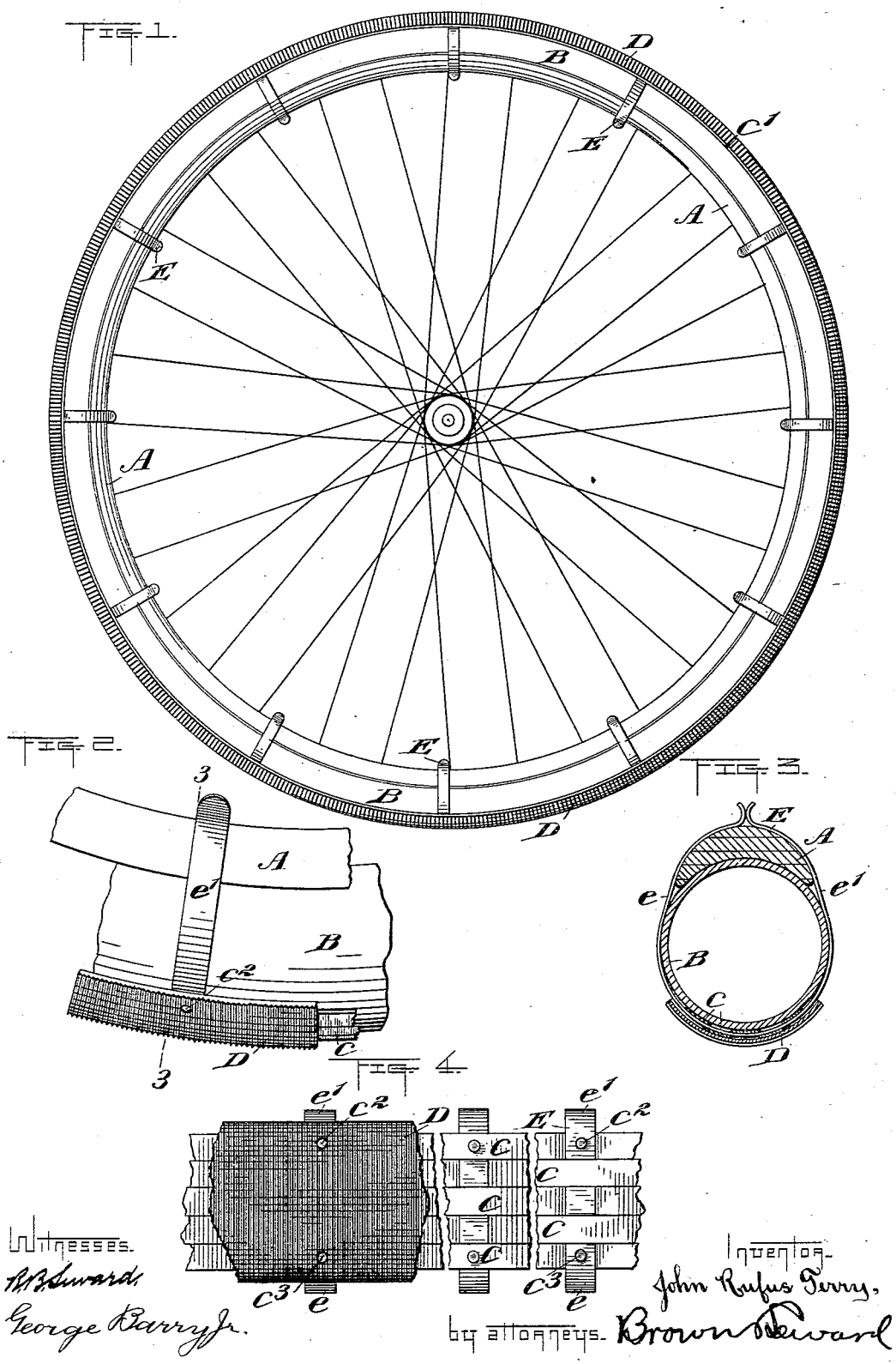

JOHN RUFUS TERRY, OF LONG ISLAND CITY, NEW YORK.

TIRE-PROTECTOR.

SPECIFICATION forming part of Letters Patent No. 559,958, dated May 12, 1896.

Application filed January 16, 1896. Serial No. 575,755. (No model.)

*To all whom it may concern:*

Be it known that I, JOHN RUFUS TERRY, of Long Island City, in the county of Queens and State of New York, have invented a new and useful Improvement in Tire-Protectors, of which the following is a specification.

My invention relates to an improvement in tire-protectors, the object being to provide a protector for pneumatic tires which may be readily attached to and detached from the tire without deflating the same.

A further object is to provide a protector of such form that it can be readily used upon the tire when it is desired to use the wheel for snow or ice riding, the protector serving to prevent the slipping of the said wheel under such circumstances.

A practical embodiment of my invention is represented in the accompanying drawings, in which—

Figure 1 represents a side view of the wheel with my improved protector thereon. Fig. 2 is an enlarged side view of a portion of the wheel-rim and tire and the tire-protector. Fig. 3 is a transverse section on the line 3 3 of Fig. 2, and Fig. 4 is a face view of a portion of the tire-protector.

The wheel-rim is denoted by A, and the pneumatic tire by B. The protector, which is adapted to be removably secured to the wheel, consists of a series of longitudinal strips $c$, which are preferably of the proper length to surround the wheel and their ends just meeting at a point $c'$. (See Fig. 1.) These strips $c$ extend, when the protector is in position, along the tread portion of the tire and up a short distance each side of the tread portion, so as to thoroughly protect the tire. These strips are preferably of metal, and in the present instance five are shown; but the number may be varied as may be required. Upon these strips $c$ I secure a band D, preferably of rubber. This band is preferably corrugated transversely to its length, so as to prevent the slipping of the wheel when riding over ice or snow. Clips E are secured to the strips $c$ at intervals along the same, which clips are adapted to embrace the opposite sides of the tire and rim when the protector is in position for holding the protector onto the wheel. These clips E consist of two spring-arms $e$ $e'$, the free ends of the said arms being adapted to meet, or nearly so, at the back of the rim A. These clips E are secured to the strips $c$, preferably by rivets $c^2$ $c^3$, which rivets are preferably located in the outer strips $c$. These rivets $c^2$ $c^3$ also pass through the band D, serving to secure it to the said strips also.

In the accompanying drawings I have shown the clips E as interwoven with the strips $c$, as by that means the whole structure of the protector is made very rigid, and the liability of the clips becoming displaced is reduced to a minimum.

The rubber band is preferably wider than the series of strips $c$ and serves as an additional protection to the tire B. There may be any desired number of clips E for each protector as the work to which that particular wheel to which the protector is to be attached may require.

In operation, supposing that it be desired to attach the protector to the wheel, the clips E are successively sprung around the sides of the tire B and the rim A, and when all of the said clips are thus secured the strips $c$, with their attached band D, will be locked along the tread portion of the tire. If desired, the ends of the longitudinal strips $c$ may be secured together instead of being left free and the protector as a whole sprung on sidewise. It will thus be seen that the strips $c$ serve to effectually prevent the puncturing of the tire B, and the corrugated band D prevents the slipping of the wheel.

It is evident that slight changes might be resorted to in the form and arrangement of the several parts without departing from the spirit and scope of my invention. Hence I do not wish to limit myself strictly to the structure herein set forth; but

What I claim is—

In combination, a wheel-rim, a pneumatic tire therein, a tire-protector composed of a series of non-puncturable strips extending along the tread of the tire, and spring-clips spaced apart along the protector and adapted to embrace the tire and rim of the wheel, the said clips being interwoven with the strips and securely fastened thereto for locking the strips together and preventing the displacement of the clips, substantially as set forth.

JOHN RUFUS TERRY.

Witnesses:
 FREDK. HAYNES,
 IRENE B. DECKER.